United States Patent

Yoshigai

[11] 4,026,390
[45] May 31, 1977

[54] GUY WIRE SUSPENSION DEVICE FOR CENTER-PULL TYPE CALIPER BRAKES FOR BICYCLES

[75] Inventor: Kiyokazu Yoshigai, Higashi-Osaka, Japan

[73] Assignee: Yoshigai Kikai Kinzoku Kabushiki Kaisha, Osaka, Japan

[22] Filed: Jan. 28, 1976

[21] Appl. No.: 652,993

[30] Foreign Application Priority Data

Sept. 6, 1975  Japan .............................. 50-123045

[52] U.S. Cl. .............................. 188/24; 74/501 R; 188/2 D
[51] Int. Cl.² ....................... F16C 1/12; B62L 1/02
[58] Field of Search .................. 188/24, 25, 26, 27, 188/2 D; 74/501 R

[56] References Cited

UNITED STATES PATENTS

| 3,554,329 | 1/1971 | Shimano | 188/24 |
| 3,861,714 | 1/1975 | Evans et al. | 188/24 |

FOREIGN PATENTS OR APPLICATIONS

| 26,453 | 11/1906 | Austria | 188/24 |
| 91,202 | 3/1968 | France | 188/24 |
| 908,965 | 11/1945 | France | 74/501 |
| 1,270,686 | 7/1961 | France | 188/24 |
| 146,426 | 7/1931 | Switzerland | 188/2 D |
| 22,455 | 11/1903 | United Kingdom | 188/24 |

Primary Examiner—George E. A. Halvosa
Attorney, Agent, or Firm—Armstrong, Nikaido & Marmelstein

[57] ABSTRACT

There is disclosed a guy wire suspension device for center-pull type caliper brakes for bicycles, comprising a suspension unit provided with a groove for receiving at least two guy wires interconnecting a pair of arches, and a brake operating Bowden cable inner wire fixing unit to be integrally assembled to the suspension unit transversely of the latter, the arrangement being such that the at least two guy wires received in said groove are equally divided by the inner wire of the Bowden cable vertically inserted into the suspension unit so that at least one guy wire exists on either side of the inner wire, and that the lower end of the inner wire extending through the suspension unit is fixed by the fixing unit at a position below the level where the guy wires are received, thereby assuring the application of an equal upward force to each guy wire for secure and stabilized brake operation.

4 Claims, 10 Drawing Figures

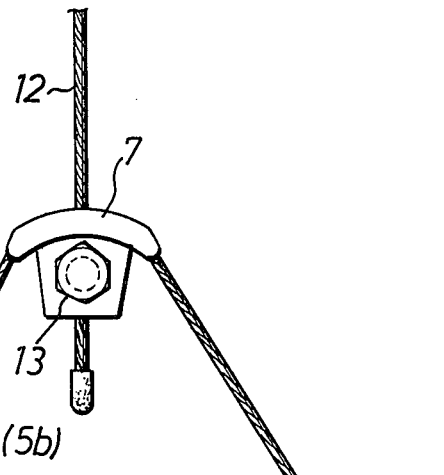
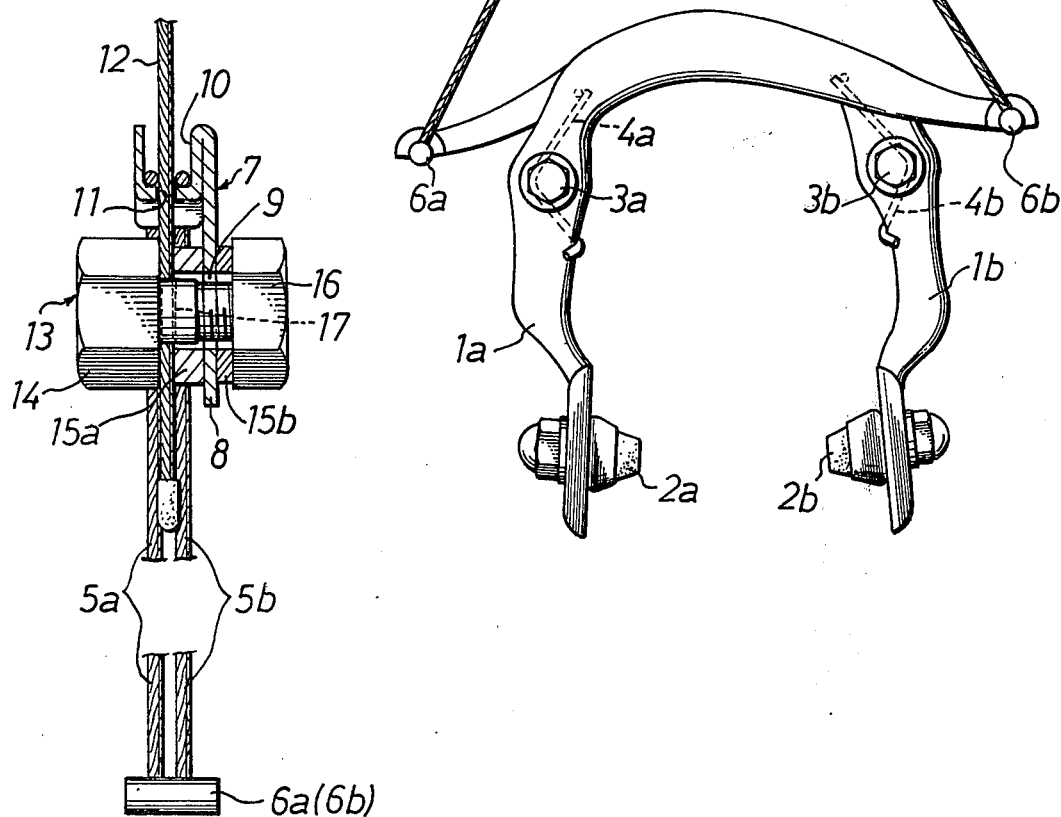

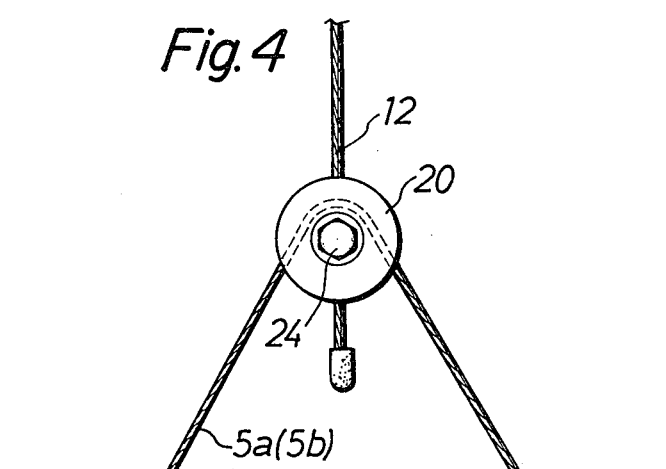
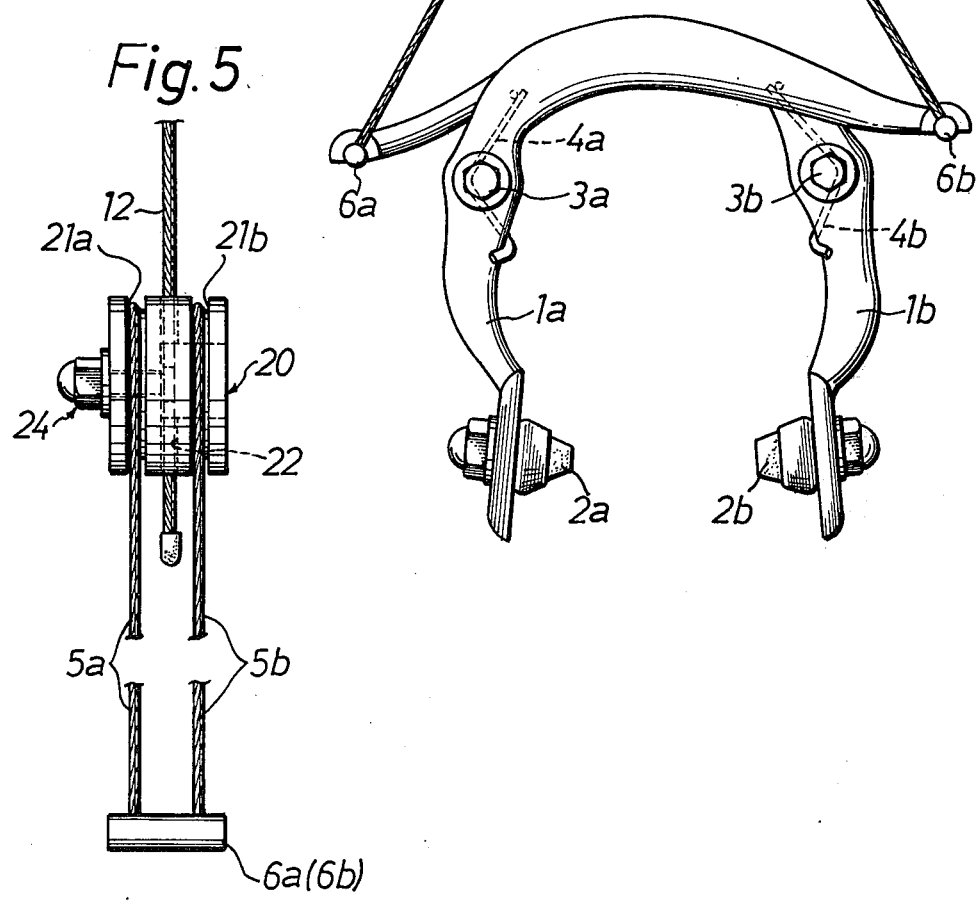

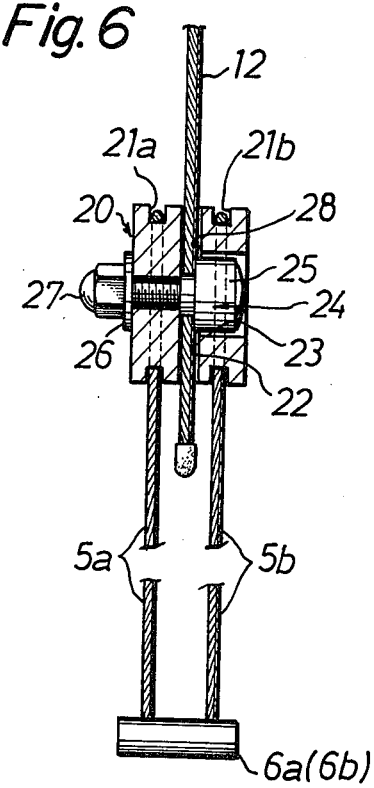
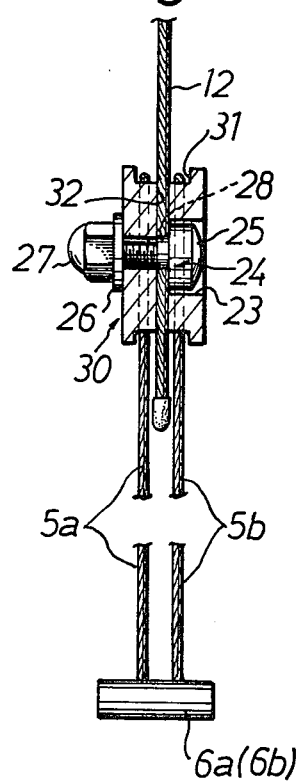
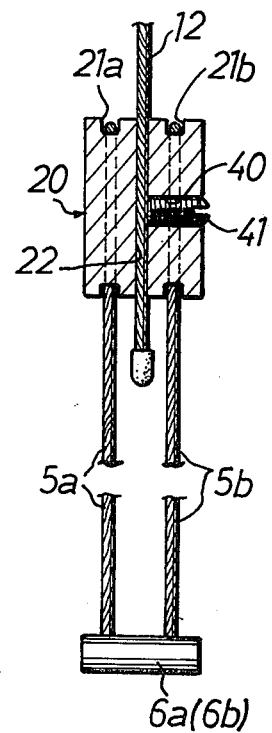

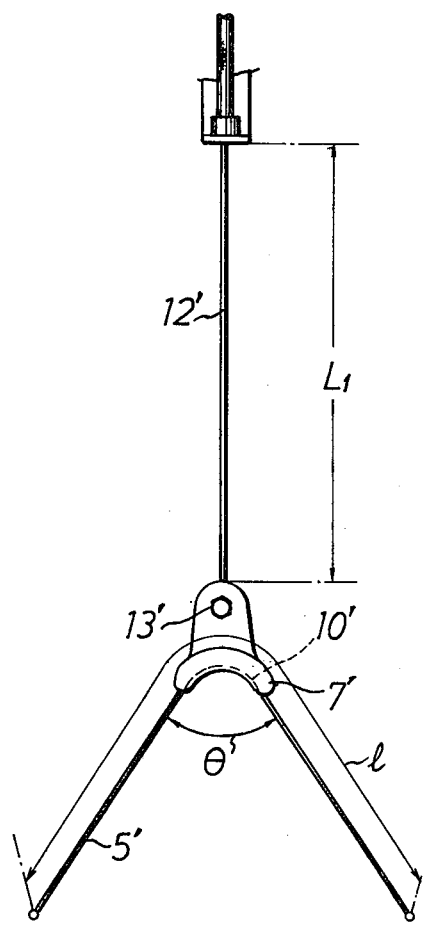
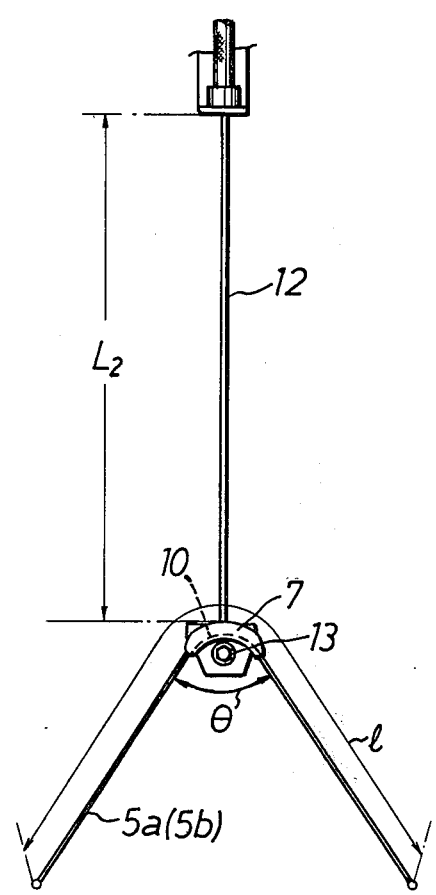

GUY WIRE SUSPENSION DEVICE FOR CENTER-PULL TYPE CALIPER BRAKES FOR BICYCLES

BACKGROUND OF THE INVENTION

The present invention relates to a guy wire suspension device for center-pull type caliper brakes for bicycles.

The conventional center-pull type caliper brake comprises a pair of arches provided with shoes and assembled to the front or back fork of the bicycle and resiliently urged to their normal non-braking spread condition, a single guy wire interconnecting said pair of arches and received in the groove of a suspension unit connected to the lower end of the inner wire of a brake operating Bowden cable, and a Bowden cable inner wire fixing unit consisting of a bolt and a nut and assembled to said suspension unit at a position above the level where said guy wire is received in said groove.

In the coventional brake of this type, since the pair of arches are interconnected by a single guy wire bent in an inverted V-shape, if the guy wire breaks as a result of a continued repetition of the braking operation, it is no longer possible to apply brakes. Thus, the conventional brake is inferior in safety and durability. Further, it is difficult to establish alignment between the inner wire fixing location and the guy wire receiving location so as to correctly position the guy wire on an extension of the Bowden cable, and the guy wire tends to be deviated forwardly or rearwardly from the axis of the inner wire, thus making it impossible to correctly pull up the guy wire and suspension unit by pulling the inner wire or resulting in lack of the upward force, so that there is the problem that a secure and stable braking effect cannot be achieved.

SUMMARY OF THE INVENTION

The present invention provides a guy wire suspension device for center-pull type caliper brakes for bicycles designed to eliminate the drawbacks described above. Objects of the invention are first to reduce the force applied per guy wire to thereby improve the durability while if one guy wire is broken, another guy wire enables braking operation to be effected without hindrance, and secondly to prevent the guy wires from becoming deviated with respect to the axis of the Bowden cable and assure that the upward force will be equally applied to the at least two guy wires to provide for a secure and stabilized braking effect; other objects will become clear from the following description to be given with reference to the accompanying drawings.

BRIEF DESCRIPTION OF THE DRAWINGS

FIG. 1 is an entire front view of a guy wire suspension device according to the present invention shown in attached relationship to a center-pull type caliper brake;

FIG. 2 is a side view, partly broken away, of the arrangement shown in FIG. 1;

FIG. 4 is an entire front view of a second embodiment of the present invention;

FIG. 5 is a side view of the arrangement shown in FIG. 4;

FIG. 6 is a side view, partly broken away, of the arrangement shown in FIG. 4;

FIG. 7 is a side view, partly broken away, of a third embodiment of the present invention corresponding to FIG. 6;

FIG. 8 is a side view, partly broken away, of a fourth embodiment of the present invention; and FIG. 9 (I) and (II) is a view for explanation of the guy wire suspension device in comparison with an article of the prior art.

DESCRIPTION OF THE PREFERRED EMBODIMENTS

Figure 3:
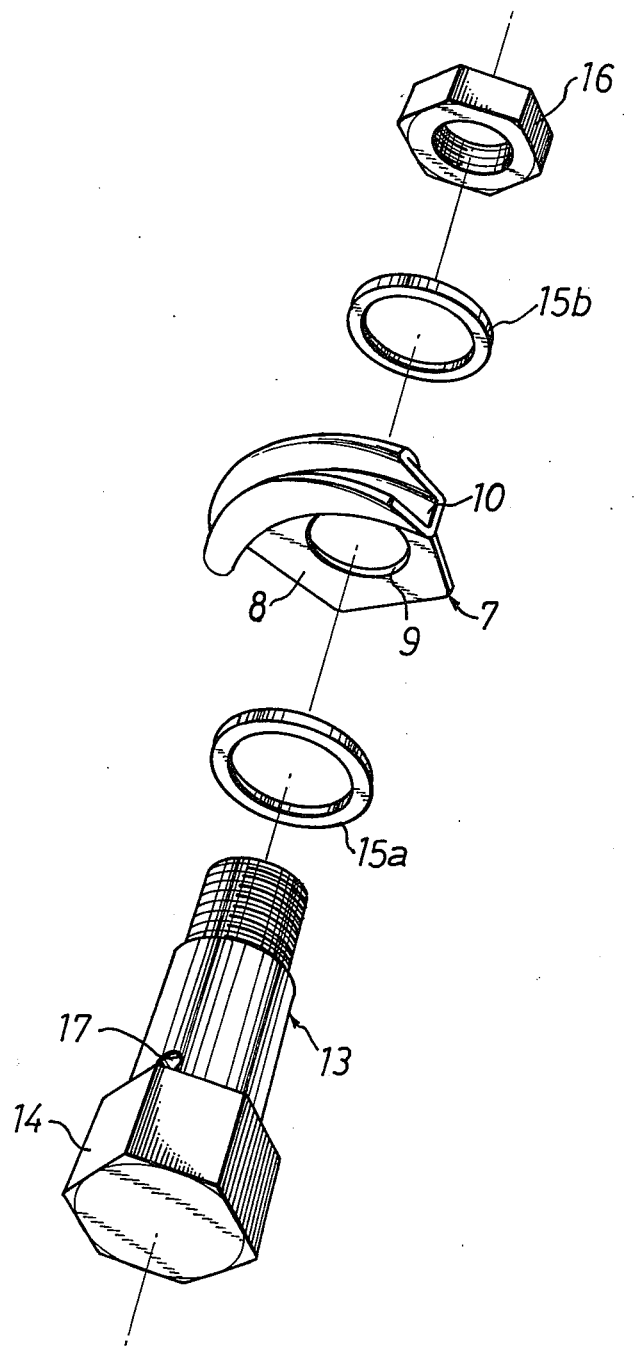
FIG. 3 is a perspective view showing a guy wire suspension unit and an inner wire fixing unit shown in an exploded state.

FIGS. 1–3 show a first embodiment of the present invention, wherein 1a and 1b designate a pair of arches constituting a center-pull type caliper brake for a bicycle and having shoes 2a and 2b attached to the lower ends thereof to be pressed against the rim of a bicycle wheel. The arches 1a and 1b are attached at their intermediate regions to the front or back fork of a bicycle by attachment bolts 3a and 3b and resiliently urged to their normal outwardly non-braking condition by springs 4a and 4b. Designated at 5a and 5b are at least two guy wires (two such wires being shown in the illustrated example) connected to the upper ends of the arches 1a and 1b by couplings 6a and 6b joined to opposite ends of the guy wires.

A suspension unit 7 for said guy wires is formed of a single metal plate, and as shown in FIG. 3, its flat main portion 8 is provided with a bolt hole 9 extending transversely thereof for receiving a Bowden cable inner wire fixing unit to be later described, the upper edge of said main portion 8 being bent in a U-shape to provide a guy wire receiving groove 10 opened at opposite ends thereof for receiving at least two guy wires 5a and 5b, as shown in FIG. 2. Designated at 11 is a Bowden cable inner wire receiving aperture formed in said groove 10 at the center thereof between opposite ends and between opposite walls of the groove. Thus, the inner wire 12 of a brake operating Bowden cable can be vertically inserted into said aperture.

A Bowden cable inner wire fixing unit 13 to be removably assembled to said suspension unit 7 consists of a headed bolt 14, a pair of washers 15a and 15b, and a nut 16 to be screwed onto said bolt 14, as shown in FIG. 3. As shown in FIG. 2, the bolt 14 is transversely inserted into the bolt hole 9 in the suspension unit 7 with the flat main portion 8 of the latter between the pair of washers 15a and 15b and the nut 16 is then tightened to assemble the bolt integrally to the suspension unit. Designated at 17 is a Bowden cable inner wire receiving aperture formed in the shank of the bolt 14. With said aperture 17 aligned with the inner wire receiving aperture 11 in the groove 10 of the suspension unit 7, the inner wire 12 is inserted into these apertures and fixed in position between the head of the bolt 14 and the washer 15a when said nut 16 is tightened. Therefore, in mutual integral assembled relationship to the fixing unit 13 as shown in FIGS. 1 and 2, the suspension unit 7 receiving the guy wires 5a and 5b in its groove 10 cooperates with said fixing unit 13 to hold the lower end of the inner wire 12 of the Bowden cable as securely as if having said lower end tied thereto.

FIGS. 4–6 show a second embodiment of the guy wire suspension device according to the present invention, particularly a first mpdification of the guy wire suspension unit and inner wire fixing unit. In these Figures, 20 designates a suspension unit in the form of a disc as a whole. As shown in FIGS. 5 and 6, it has a pair of guy wire receiving grooves 21a and 21b formed in the outer peripheral surface thereof and two guy wires 5a and 5b are received therein. In this case, each of the grooves 21a, 21b receives one guy wire. A Bowden cable inner wire receiving aperture 22 is disposed intermediate between the grooves 21a and 21b and extends diametrically through the disc type suspension unit 20. The disc type suspension unit 20 is provided with a transversely extending stepped bolt hole 23 communicating with said inner wire receiving aperture 22. Designated at 24 is an inner wire fixing unit consisting of a heated bolt 25, a washer 26, and a cap nut 27 to be screwed onto the shank of said bolt 25. As shown in FIG. 6, the bolt 25 is inserted into the stepped bolt hole 23 in the suspension unit 20 and integrally assembled to the suspension unit 20 through the washer 26 by tightening the cap nut 27. In this case, the shank of the bolt 25 is formed with an inner wire receiving aperture 28 capable of communicating with the inner wire receiving aperture 22 in the suspension unit 20, so that the inner wire 12 of the Bowden cable inserted in the two apertures 22 and 28 is fixedly held between the head of the bolt 25 and the step surface of the bolt hole 23 when the cap nut 27 is tightened. The parts in FIGS. 4–6 which are the same as those in FIGS. 1–3 are indicated by the same reference characters.

FIG. 7 illustrates a third modification of the present invention, particularly a second modification of the suspension unit. Whereas the disc type suspension unit 20 shown in FIGS. 4–6 is provided with a pair of transversely separated guy wire receiving grooves 21a and 21b, the suspension unit 30 in FIG. 7 which is substantially the same disc type as in FIGS. 4–6 is provided with a single wide guy wire receiving groove 31 adapted to receive at least two guy wires 5a and 5b as in the case of the first embodiment shown in FIGS. 1–3. In this case, an inner wire receiving aperture 32 is disposed at the center of and extends diametrically through the groove 31, in substantially the same manner as in the first embodiment shown in FIGS. 1–3. The rest of the construction is the same as in the embodiment shown in FIGS. 4–6. Thus, in FIG. 7, the same reference characters as those in FIGS. 4–6 indicate the same parts.

FIG. 8 illustrates a fourth embodiment of the present invention, particularly a third modification of the guy wire suspension unit and inner wire fixing unit. This modification is the same as the embodiment shown in FIGS. 4–6 in that a suspension unit 20 is employed which is of the disc type and which is provided with a pair of separate guy wire receiving grooves 21a and 21b in the outer peripheral surface thereof, and that the suspension unit is provided with a diametrically extending inner wire receiving aperture 22 disposed intermediate between the two grooves 21a and 21b, but it differs therefrom in that an inner wire fixing unit 40 is constituted by a set screw alone and that a hole 41 for receiving said set screw 40 is a threaded hole disposed at the center of and extending transversely of the disc type suspension unit 20 and communicating with said inner wire receiving aperture 22. In this case, the inner wire 12 of the Bowden cable inserted in the inner wire receiving aperture 22 is fixedly held between the inner wall surface of the aperture 22 and the front end of the set screw 41 screwed into the set screw receiving hole 41. In this FIG. 8 also, the same reference characters as those in FIGS. 4–6 indicate the same parts.

In addition, it goes without saying that the centerpull type caliper brake connected to the operating lever on the handle side through the at least two guy wires 5a and 5b and the Bowden cable including the inner wire 12 is operated in such a manner that a pull on the inner wire 12 upwardly moves the suspension unit and the guy wires 5a, 5b, causing the pair of arches 1a, 1b to swing against the force of the spreading springs 4a, 4b around the attachement bolts 3a, 3b, so that the brake shoes 2a, 2b are pressed against the rim of the wheel to brake the same.

In any of the embodiments described above, it is noted that at least two guy wires are received in the guy wire receiving groove or grooves in the suspension unit and equally divided so that at least one guy wire exists on either side of the inner wire of the Bowden cable vertically extending through the suspension unit, and that the lower end of the inner wire is fixed at a position below the level where the guy wires are received in said groove or grooves by the inner wire fixing unit integrally assembled to the suspension unit. That is, referring to the first embodiment shown in FIGS. 1–3, the guy wire receiving groove 10 in the suspension unit 7 is adapted to receive at least two guy wires 5a, 5b and the inner wire receiving aperture 11 is formed in the groove 10 at the center thereof, so that the inner wire 12 inserted in said aperture 11 equally divides the at least two guy wires 5a, 5b so as to have at least one guy wire disposed on either side thereof within the groove 11. On the basis of such arrangement, it is possible to apply an upward pull on the inner wire 12 uniformly to the guy wires 5a, 5b, and in addition to the prevention of the upward pull from becoming insufficient, a positive and stable braking effect can be obtained in a smooth pulling-up operation. As a result of the at least two guy wires 5a, 5b interconnecting the pair of arches 1a, 1b, even if one guy wire 5a or 5b is broken, the other is effective to compensate for such situation, thereby preventing the braking operation from becoming impossible. Thus, it is apparent that the invention is advantageous from the standpoint of safety and durability.

Further, as described with reference to the first embodiment shown in FIGS. 1–3, the inner fixing unit 13 is integrally assembled to the suspension unit 7 by being inserted into the bolt hole 9 formed in the flat main portion 8 thereof located below the level of the guy wire receiving groove 10, while the lower end of the inner wire 12 inserted in the inner wire receiving apertures 17 formed in the groove 10 and the shank of the bolt 14, respectively, is fixed by tightening the bolt 14 and nut 16 at a position below the level where the guy wires 5a, 5b are received in the groove 10. This arrangement is advantageous in that even if the distance between the lower edge of the Bowden cable casing receiving member and the upper edge of the suspension unit is short as when the arches 1a, 1b are to be attached to a back fork of reduced length, the braking operation can be smoothly carried out without the danger of the upper edge of the suspension unit 7 readily striking the lower edge of the Bowden cable casing receiving member.

In recent years, bicycles have their back forks reduced in length to provide for increased travel stability. With the back fork reduced in length while maintaining the outer diameter of the back wheel unchanged, if the arches of the center-pull type caliper brake are attached to the back fork, it follows that the distance between the lower end of the Bowden cable casing receiving member fixed to the back fork and the upper end of the arch connecting guy wire suspension unit is small.

With this situation presumed, the present invention will now be compared with the prior art article with reference to FIG. 9. Suppose that the angle θ defined by a guy wire suspended in an inverted V shape by the suspension unit and the entire length l of said guy wire are constant in both cases. In the conventional guy wire suspension device, as shown in FIG. 9 (I), the suspension unit 7' is zigzag as a whole and the bolt 13' for fixing the lower end of the inner wire 12' of the Bowden cable is assembled to the upper portion of said suspension unit by being inserted therein. Further, at a position below the level where inner wire 12' is fixed by the bolt 13', the guy wire 5' is received in an inverted V shape in the groove 10' defined as a result of the lower edge of the suspension unit 7' being bent in a U shape. Therefore, the distance $L_1$ between the upper edge of the suspension unit 7' and the lower edge of the Bowden cable casing receiving member is relatively shorter by an amount corresponding to the distance between the place where the inner wire 12' is fixed and the place whe the guy wire 5' is received.

In contrast therewith, in the case of the present invention, as shown in FIG. 9 (II), the unit 13 for fixing the lower end of the inner wire 12 is assembled to the lower portion of the suspension unit 7 and the guy wires 5a, 5b are received in the groove 10 formed in the upper edge of the suspension unit 7 at a position above the level where the inner wire 12 is fixed by the fixing unit 13. Therefore, the distance $L_2$ between the upper edge of the suspension unit 7 and the lower edge of the Bowden cable casing receiving member is longer than in the case of the prior art article shown in FIG. 9 (I).

This means that if the distance over which the inner wire is pulled up is the same in both cases, the reduced distance $L_1$ in the prior art article will result in the upper edge of the suspension unit 7' readily striking the lower edge of the Bowden cable casing receiving member, whereas in the present invention the relatively increased length $L_2$ allows attachment of the device without any trouble even if the length of the back fork is decreased.

What is claimed is:

1. A guy wire suspension device for center-pull type caliper brakes for bicycles said brakes having a pair of arches provided with shoes for engaging a wheel of said bicycle, said arches being urged to a normally spread condition during nonbraking and adapted to brake the wheel by pulling the inner wire of a Bowden cable connected to a brake lever and coupled to said device, said device comprising:
   a. at least two guy wires each of said guy wires having each end connected to one of said arches;
   b. a suspension unit including at least one groove for receiving said at least two guy wires; and
   c. a Bowden cable inner wire fixing unit coupled to said suspension unit for connecting said inner wire to said suspension unit, wherein said inner wire extends vertically into said suspension unit with at least one of said guy wires being positioned on each side of said inner wire and wherein said inner wire fixing unit fixes said inner wire in said suspension unit at a position below the highest level at which said guy wires are received in said suspension unit.

2. A guy wire suspension device for center-pull type caliper brakes for bicycles as set forth in claim 1, wherein said suspension unit comprises a single metal plate having a flat main portion and a U-shaped guy wire receiving groove opened at both ends and formed by forwardly bending the upper edge of said main portion, said suspension unit having an inner wire insertion aperture disposed at the center of said groove and extending vertically therethrough and an aperture extending transversely through said main portion for insertion of said inner wire fixing unit therein.

3. A guy wire suspension device for centerpull type caliper brakes for bicycles as set forth in claim 1, wherein said suspension unit comprises a disc having a pair of grooves around the outer peripheral surface thereof for receiving said at least two guy wires, a diametrically extending aperture disposed intermediate betweeb said two grooves for insertion of said inner wire therein, and a transversely extending aperture disposed at the center thereof for insertion of said inner wire fixing unit therein.

4. A guy wire suspension device for center-pull type caplier brakes for bicycles as set forth in claim 5, wherein the suspension unit comprises a disc having a guy wire receiving groove centrally around the outer peripheral surface thereof, a diametrically extending inner wire insertion aperture disposed centrally of said groove, and an aperture at the center extending transversely thereof for insertion of said inner wire fixing unit therein.

* * * * *